Feb. 15, 1966  A. J. CLARK ETAL  3,234,800
PUSHBUTTON CONSTRUCTION
Filed April 28, 1961
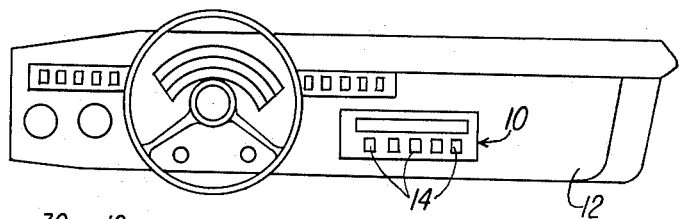
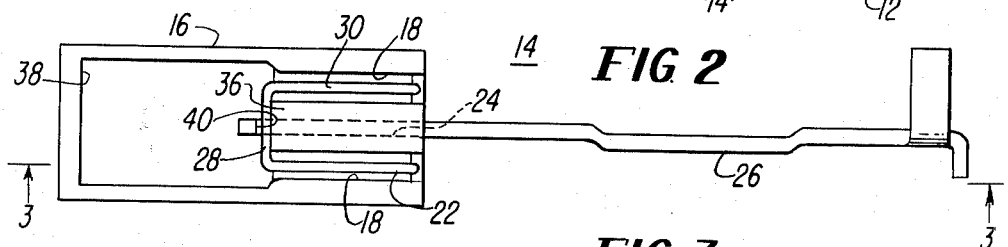
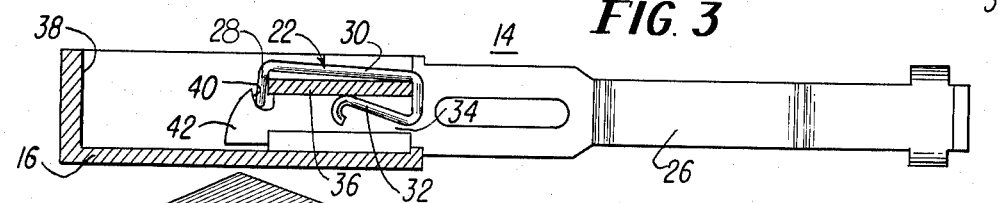
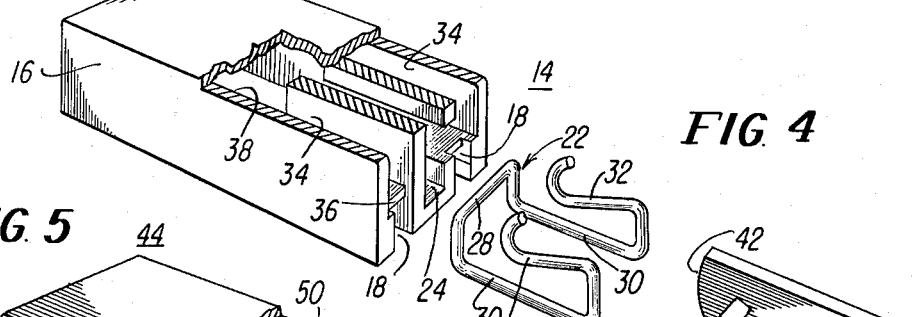
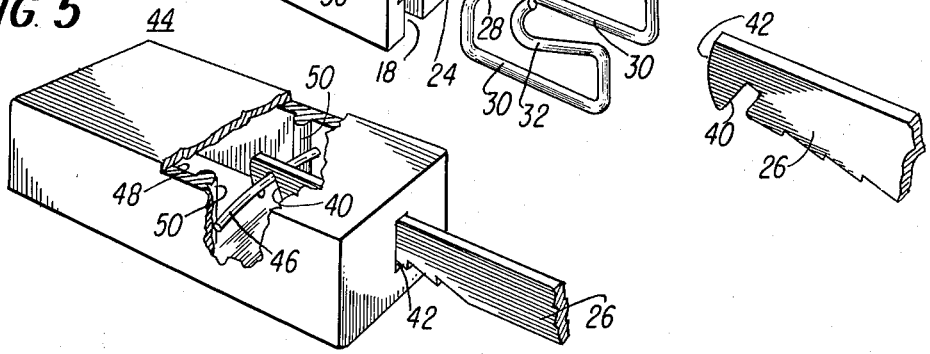
INVENTORS
ALFRED J. CLARK
BY REYNALD E. THOMPSON
ATTYS.

United States Patent Office 3,234,800
Patented Feb. 15, 1966

3,234,800
PUSHBUTTON CONSTRUCTION
Alfred J. Clark, Palatine, and Reynald E. Thompson, Barrington, Ill., assignors to Motorola, Inc., Chicago, Ill., a corporation of Illinois
Filed Apr. 28, 1961, Ser. No. 106,403
2 Claims. (Cl. 74—10.27)

This invention relates to control operating mechanisms and more particularly to a removable pushbutton assembly for controlling automobile radio receivers and the like.

Automobile radio receivers generally are mounted behind the dashboard of automobiles by various fastening means and through electrical connections. When the receiver has been mounted in this manner it is extremely difficult to remove, and ordinarily is only removed when service or replacement is required. It is sometimes desired however to mount the pushbuttons on the receiver after the receiver has been fixed behind the dashboard of the automobile, or to remove one or more pushbuttons from the receiver. This removal may become necessary when a button is damaged, or when a purchaser wishes to change the color of the buttons so that they will blend with the particular dashboard. In the past changing or replacing the pushbutton arrangement would have necessitated removal of the entire receiver from the dashboard and a difficult operation in removing and replacing the pushbuttons from the key slides.

Inasmuch as pushbuttons are used on tuners wherein the slides are released by pulling and locked by pushing, it is essential that the pushbuttons be rigidly locked to the key slides.

It is therefore an object of the present invention to provide readily removable pushbuttons in a pushbutton control assembly.

Another object of this invention is to provide new and improved fastening means to maintain a pushbutton removably locked upon an automobile radio receiver key slide.

Still another object of this invention is to provide a pushbutton for automobile radio receivers which may be mounted, exchanged or repaired without necessitating removal of the entire receiver from behind the receiver of the dashboard of the automobile.

A feature of the present invention is the provision of a pushbutton mounted upon a key slide and which is locked in position by means of a removable spring clip.

Another feature of this invention is the provision of an inexpensive and improved spring clip adapted to lock a pushbutton upon a key slide, wherein the key slide is formed with a notched end portion to receive the spring clip and whereby the pushbutton may be removed from outside of the receiver.

Still another feature of the present invention is the provision of a plastic pushbutton having a groove formed therein to seat a spring clip which maintains a pushbutton locked upon an automobile radio receiver key slide.

A further feature of the present invention is the provision of a spring clip disposed upon a pushbutton and having a folded section adapted to drop into locking engagement in a notch formed in an automobile radio receiver key slide.

Another feature is the provision of a straight spring clip adapted to hold, in locking relationship, a pushbutton upon a key slide.

FIG. 1 is a front perspective view of a portion of an automobile dashboard showing a pushbutton operated radio receiver mounted therein;

FIG. 2 is a bottom view of the pushbutton assembly of the present invention;

FIG. 3 is a sectional view taken on lines 3—3 of FIG. 2;

FIG. 4 is an exploded view of the pushbutton assembly of the present invention; and FIG. 5 is a view, partly broken away, of a modified form of the pushbutton of the present invention.

The pushbutton assembly constructed in accordance with the present invention comprises a pushbutton which is removably secured to the end of a key slide of a tuner mechanism. The pushbutton has a groove formed therein to seat a U-shaped spring clip having a folded closed end portion adapted to fit into a V-notch in the key slide. The other end of the spring clip, which comprises a pair of folded legs, resiliently engages or clamps upon the pushbutton. When it is desired to remove the pushbutton, a suitable tool may be placed under the closed end of the spring clip to release it from the key slide, whereby the pushbutton is slidable upon the key slide and therefore readily removable therefrom. A straight spring clip may also be used. Here the spring is resiliently held between the inner walls of the pushbutton and is adapted to drop into a notch upon the key slide when the pushbutton is mounted on the key slide.

Referring now particularly to FIG. 1, a radio receiver 10 is shown fixed within a dashboard 12. A plurality of pushbutton assemblies 14 are mounted upon the receiver to control the operation thereof. Each of the pushbutton assemblies 14 (FIGS. 1, 2, 3) comprises a main body portion 16 formed with a pair of grooves 18 (FIGS. 2 and 4) at the upper end thereof. The grooves 18 seat a spring clip 22 and restrict the horizontal movement thereof. A channel 24 is formed in the body portion 16. The key slide 26, which is connected at one end to the tuner (not shown) within the receiver 10 is telescopically received into the channel 24, whereupon the body portion 16 is mounted upon the key slide 26. The spring clip 22 secures the body portion 16 to the key slide 26. The clip 22 is shown of a generally U-shaped configuration wherein the closed end 28 is folded or bent downwardly to be substantially perpendicular to the main arms 30 of the clip 22. The legs 32 of the clip 22 are reversely folded and are inclined with respect to the main arms 30. With the legs 32 in this position, they clamp the spring clip 22 to the main body portion 16 of the pushbutton assembly 14 by engagement with the wall 36 of the body portion 16 (FIG. 3).

A hollow portion 38 is formed in the body portion and the closed end portion 28 of the clip 22 fits downwardly into the hollow portion 38 and seats itself into a groove like notch 40 formed in the key slide 26. It will be understood that, although the spring clip 22 is shown of a generally U-shaped configuration, it may, in the practice of this invention, be a solid piece of spring metal having a flange to seat into the groove of the key slide.

Such a configuration is seen in FIG. 5. In this embodiment the key slide 26 is fitted within a slot 42 formed in a pushbutton 44. A straight spring clip 46 is resiliently held in position within a cavity 48 in the pushbutton 44. The spring clip 46 abuts at each end upon a spring retaining flange 50.

With regard to FIGS. 2, 3 and 4, to mount the body portion 16 upon the key slide 26, the legs 32 of the clip 22 are inserted into grooves 34. The closed end portion 28 is then snapped over the wall 36 into the opening 38. The body portion is then fitted over the key slide 26 to telescopically receive the key slide 26 into the channel 24. The end portion 42 of the key slide 26 is then forced past the closed end 28 of the clip which then drops into the groove 40 and locks the body portion 16 in place on the key slide 26. The main arms 30 are spaced from the wall 36 so that the clip applies a resilient tension against the portion 42 of the slide.

When it is desired to remove the pushbutton body portion 16 from the key slide 26 from outside of the dashboard 12, the closed end portion 28 of the clip is flexed from its position in the notch 40 thereby releasing the body portion 16 from engagement with the key slide 26. Closed end portion 28 of clip 22 may be flexed from its position in notch 40 by inserting a screwdriver or other appropriate tool through the open side of body portion 16 and wedging it between clip 22 and wall 36. The body portion may then be slidably removed from the key slide 26. The key slide 26 in FIG. 5 is fixed to the pushbutton by inserting the key slide 26 into grooved channel 42 formed in the pushbutton, generally indicated at 44. The straight spring clip 46 is resiliently held between the inner walls of the pushbutton 44, which define the cavity 48. The spring clip 46 falls into the groove notch 40 and remains resiliently seated therein to hold the pushbutton 44 upon the key slide 26.

The invention provides therefore a pushbutton assembly for a radio receiver mounted behind the dashboard of an automobile, wherein the body portion of the assembly is mounted upon the key slides and is removable therefrom from outside of the dashboard behind which the receiver is mounted.

We claim:
1. A pushbutton slide assembly for use in a radio receiver to be mounted in an automobile dashboard, said pushbutton slide assembly including in combination, a key slide for tuning the receiver, a hollow main body portion having a slot formed therein adapted to permit passage of an end of said key slide into the interior of said hollow main body portion, a mounting portion formed on the interior of said hollow main body portion, and means adapted to secure said body portion to said key slide including a spring clip positioned inside said body portion and having end portions removably clamped upon said mounting portion, said spring clip having a center portion extending transverse to said key slide in said body portion, said key slide having a notch formed therein, said center portion of said spring clip being biased in said notch in said key slide.

2. A pushbutton slide assembly for operating a device including in combination, a key slide adapted to be connected to the device, a hollow main plastic body portion having a slot formed therein adapted to permit passage of an end of said key slide into the interior of said hollow main body portion, a mounting portion formed on the interior of said hollow main body portion, and means adapted to secure said body portion to said key slide including a spring clip positioned inside said body portion and having end portions removably clamped upon said mounting portion, said spring clip having a center portion extending transverse to said key slide in said body portion, said key slide having a notch formed therein, said center portion of said spring clip being biased in said notch in said key slide.

References Cited by the Examiner

UNITED STATES PATENTS

| | | | |
|---|---|---|---|
| 1,245,939 | 11/1917 | Mallat | 292—353 |
| 1,415,354 | 5/1922 | Jacobs et al. | 287—119 |
| 1,825,357 | 9/1931 | Lasselberger | 24—230 |
| 2,149,550 | 3/1939 | Richards et al. | 24—230 |
| 2,266,643 | 12/1941 | Kruse | 287—119 |
| 2,365,088 | 12/1944 | Lane | 74—10.33 |
| 2,503,066 | 4/1950 | Plensler | 74—10.33 |
| 2,634,992 | 4/1953 | Nelson | 74—548 X |
| 2,998,109 | 8/1961 | Jahn | 189—35 |

FOREIGN PATENTS 403,979   12/1933   Great Britain.

BROUGHTON G. DURHAM, *Primary Examiner.*